United States Patent
Nakagawa

[11] Patent Number: 6,102,093
[45] Date of Patent: Aug. 15, 2000

[54] PNEUMATIC TIRE INCLUDING LONG BLOCKS AND WIDE BLOCKS

[75] Inventor: Hiroyuki Nakagawa, Kobe, Japan

[73] Assignee: Sumitomo Rubber Industries, Ltd., Hyogo-ken, Japan

[21] Appl. No.: 09/048,286

[22] Filed: Mar. 26, 1998

[30] Foreign Application Priority Data

Mar. 26, 1997 [JP] Japan ................................. 9-073579

[51] Int. Cl.⁷ ............................ B60C 11/11; B60C 11/12; B60C 107/00
[52] U.S. Cl. .............................. 152/209.2; 152/209.18; 152/902; 152/DIG. 3
[58] Field of Search ............................ 152/209.1, 209.2, 152/209.3, 209.8, 209.9, 209.11, 209.18, 209.21, 209.28, 902, DIG. 3

[56] References Cited

U.S. PATENT DOCUMENTS

| | | | |
|---|---|---|---|
| 894,377 | 7/1908 | Filler | 152/209.12 |
| 1,956,011 | 4/1934 | Evans | 152/209.3 |
| 2,068,050 | 1/1937 | Bishop | 152/209.1 |
| 3,001,568 | 9/1961 | Suominen | 152/902 |
| 3,004,578 | 10/1961 | Braudorn | 152/902 |
| 4,351,381 | 9/1982 | Roberts et al. | 152/DIG. 3 |
| 4,598,747 | 7/1986 | Flechtner | 152/DIG. 3 |
| 4,606,389 | 8/1986 | Haas | 152/209.11 |
| 4,667,718 | 5/1987 | Fontaine et al. | 152/209.18 |
| 4,936,364 | 6/1990 | Kajiwara et al. | 152/209.2 |
| 5,178,698 | 1/1993 | Shibata | 152/209.3 |
| 5,711,828 | 1/1998 | Himuro | 152/DIG. 3 |
| 5,785,780 | 7/1998 | Ochi | 152/DIG. 3 |

FOREIGN PATENT DOCUMENTS 738143  10/1955  United Kingdom .

*Primary Examiner*—Steven D. Maki
*Attorney, Agent, or Firm*—Birch, Stewart, Kolasch & Birch, LLP

[57] ABSTRACT

A pneumatic tire comprises a tread portion, the tread portion is provided in a center region with a row of long blocks and wide blocks which are disposed alternately in the circumferential direction of the tire, the center region has 30% of the tread width, the long blocks are such that the circumferential length (a) is larger than the axial length L1, the wide blocks are such that the axial length L2 is larger than the circumferential length (b), the ratio (a/b) of the circumferential length (a) and the circumferential length (b) is 1.1 to 1.5, and the ratio (S1/S2) of the surface area S1 of the long blocks and the surface area S2 of the wide blocks is 0.40 to 0.77. Preferably, the axial length L2 of the wide blocks is 18 to 30% of the tread width, and the long blocks and wide blocks are disposed such that at least one of the long blocks and at least one of the wide blocks appear in the ground contacting patch of the tire.

13 Claims, 5 Drawing Sheets ical grip is increased and at the same time the drop of grip is decreased to improve on-the-ice running performance without decreasing the resistance to uneven wear.

PNEUMATIC TIRE INCLUDING LONG BLOCKS AND WIDE BLOCKS

FIELD OF THE INVENTION

The present invention relates to a pneumatic tire particularly a studless tire in which on-the-ice performance is improved without decreasing the uneven wear resistance.

BACKGROUND OF THE INVENTION

In recent years, studless tires are widely used instead of spiked tires because the spiked tires cause damage to the surface of paved roads and dust pollution.

The studless tires have been remarkably improved in on-the-snow running performance as a result of employing a block type tread pattern comprising a large number of blocks provided with sipes and a tread rubber material being capable of keeping suppleness under very low temperature conditions.

Such studless tires are, however, still inferior to the spiked tires in running performance on iced roads, especially the so called mirrorbahn—an iced road which is very smooth like a mirror. Therefore, a pressing need is to improve running performance on mirrorbahn.

In order to improve on-the-ice running performance, it is important not only to increase the critical grip of the tire but also to decrease the difference between the critical grip and the remaining grip when exceeding the critical grip, namely the drop of grip.

In general, conventional block type tread patterns for passenger car tires comprise circumferential rows of blocks which are substantially the same size and same shape. In this case, it is easy to increase the critical grip at the sacrifice of wear resistance, but the drop of grip becomes large. In such a tire, it is difficult to control the vehicle during an emergency. On the other hand, tires whose grip drop is small are usually low in the critical grip by nature. Thus, a high critical grip and small drop of grip are contradictory requirements.

It is therefore an object of the present invention to provide a pneumatic tire in which the critical grip is increased and at the same time the drop of grip is decreased to improve on-the-ice running performance without decreasing the resistance to uneven wear.

SUMMARY OF THE INVENTION

According to the one aspect of the present invention, a pneumatic tire comprises a tread portion, the tread portion provided in a center region with a row of long blocks and wide blocks which are disposed alternately in the circumferential direction of the tire, the center region having 30% of the tread width, the long blocks being such that the circumferential length (a) is larger than the axial length L1, the wide blocks being such that the axial length L2 is larger than the circumferential length (b), the ratio (a/b) of the circumferential length (a) and the circumferential length (b) being in the range of from 1.1 to 1.5, and the ratio (S1/S2) of the surface area S1 of the long blocks and the surface area S2 of the wide blocks being in the range of from 0.40 to 0.77.

Preferably, the axial length L2 of the wide blocks is 18 to 30% of the tread width, and the long blocks and wide blocks are disposed such that at least one of the long blocks and at least one of the wide blocks appear in the ground contacting patch of the tire. The long blocks and wide blocks are provided with axially extending sipes.

BRIEF DESCRIPTION OF THE DRAWINGS

Embodiments of the present invention will now be described in detail in conjunction with the accompanying drawings.

DESCRIPTION OF THE PREFERRED EMBODIMENTS

A pneumatic tire according to the invention comprises a tread portion, a pair of axially spaced bead portions with a bead core herein, a pair of sidewall portions extending between the tread edges and the bead portions, a radial carcass ply extending between the bead portions, and a belt disposed radially outside the carcass and inside a rubber tread.

Figure 1:
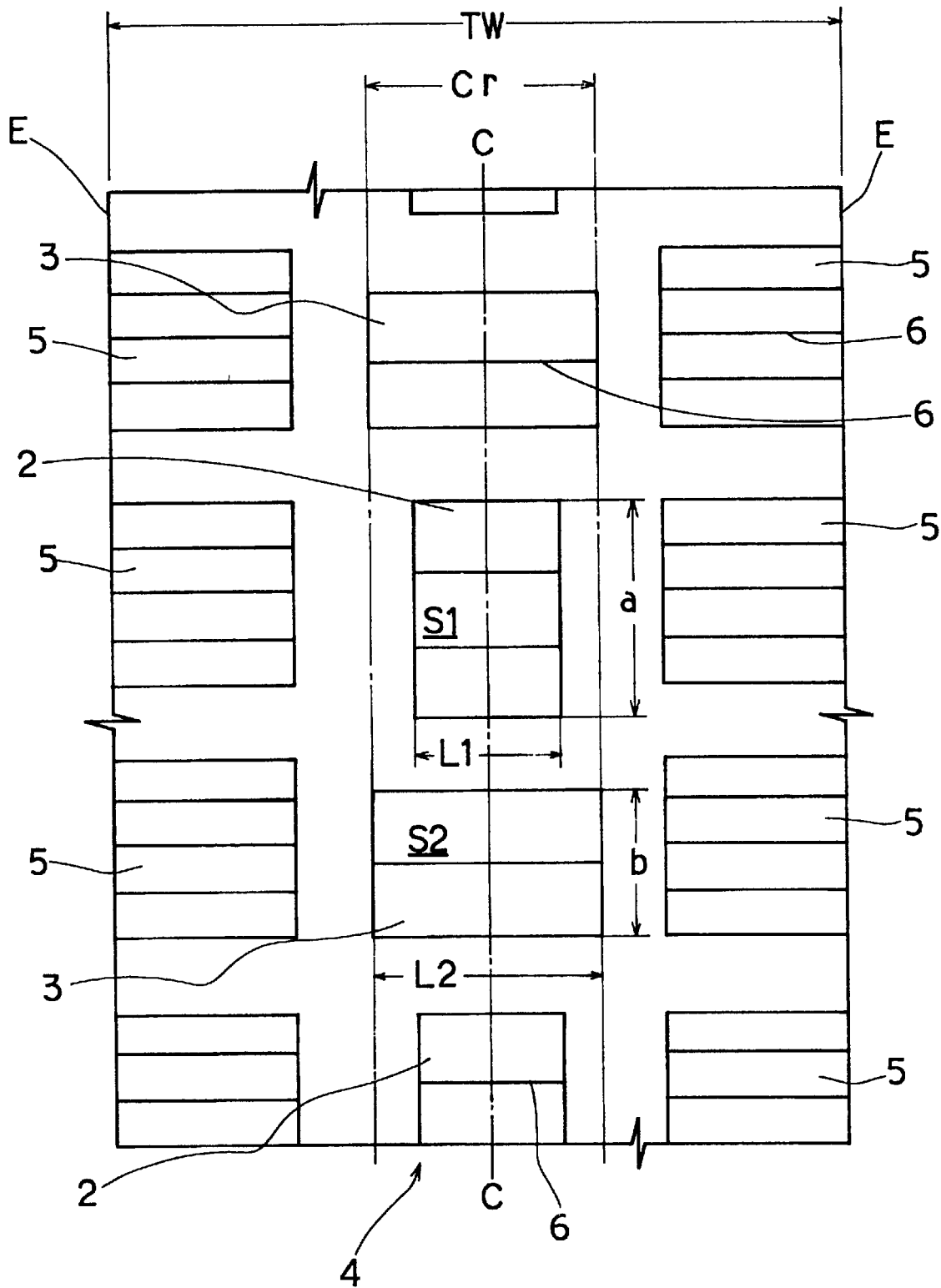
FIG. 1 is a plan view of an embodiment of the present invention showing a basic tread pattern.
Figure 10:
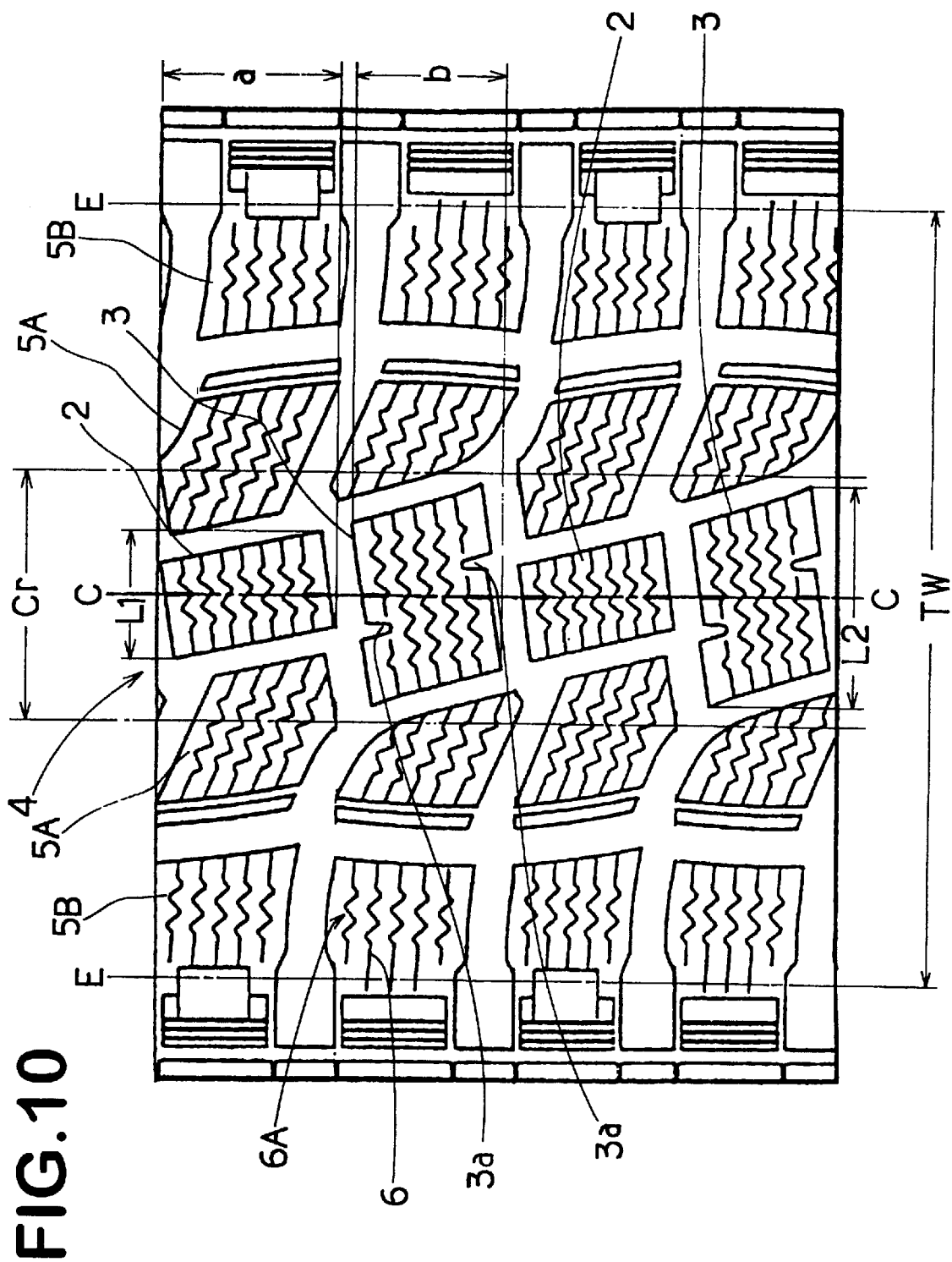
FIG. 10 is a developed plan view of another embodiment of the present invention.

In the embodiments shown in FIGS. 1 and 10, the pneumatic tires of the present invention are studless tires for passenger cars.

The tread portion is provided with at least one circumferential row 4 of long blocks 2 and wide blocks 3 which are disposed alternately in the circumferential direction. The long blocks 2 are such that the circumferential length (a) is larger than the axial length L1. The wide blocks 3 are such that the axial length L2 is larger than the circumferential length (b).

According to the present invention, the above-mentioned row 4 of long and wide blocks, 2 and 3, must be substantially disposed in the tread center region Cr because this region has a great influence on the running performance on iced roads. The "substantially" means that 80% or more of the top surface area of each block is included in the tread center region Cr. Here, the tread center region Cr is a region of 30% of the tread width TW. The remaining 35% region on each side thereof is called shoulder region hereinafter. The tread width TW is defined as the axial distance between the tread edges E when the tire is mounted on a standard rim and inflated to a standard pressure. In case of rounded shoulder, the tread edges E are defined as imaginary points which are intersecting points of an axial line tangent to the tread face line and two straight lines tangent to the buttress portions or the radially outer end portions of the tire sidewalls.

In the embodiment shown in FIG. 1, the long and wide blocks 2 and 3 have rectangular configurations. And in this example, the centers of the blocks 2 and 3 are aligned with the tire equator. However, the centers can be displaced in a zigzag manner for example.

When a circumferential row of alternately disposed long blocks and wide blocks is formed in the tread center region Cr of a tire, the critical grip increases and the drop of grip decreases.

In order to confirm this fact, various test tires (size 195/65R15) were made, changing the shapes of the blocks in the tread center region Cr, and the friction coefficient $\mu$ and slip ratio S were measured by applying a braking force to the tire on iced road to obtain the $\mu$-S curve. Then, from the obtained $\mu$-S curve, the maximum friction coefficient (hereinafter peak $\mu$) which is defined as producing a maximum braking force when the slip ratio is not more than 10%, and the friction coefficient (hereinafter lock $\mu$) when the tire was locked (slip ratio 100%) were obtained. In the test, the test tires were mounted on a standard rim (6JJx15), the tire pressure was 2.0 kgf/sq.cm, and the vertical tire load was 350 kgf. The test course was mirrorbhan whose temperature was −1.0 to −1.2 deg C at the iced surface, and the braking speed was 30 km/h.

Figure 2:
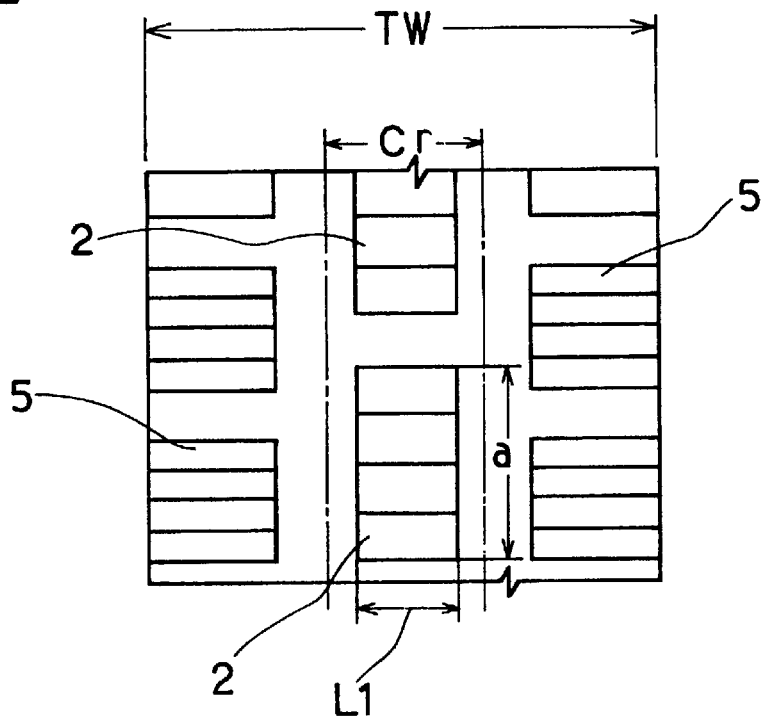
FIG. 2 is a plan view showing the tread portion of a test tire.
Figure 3:
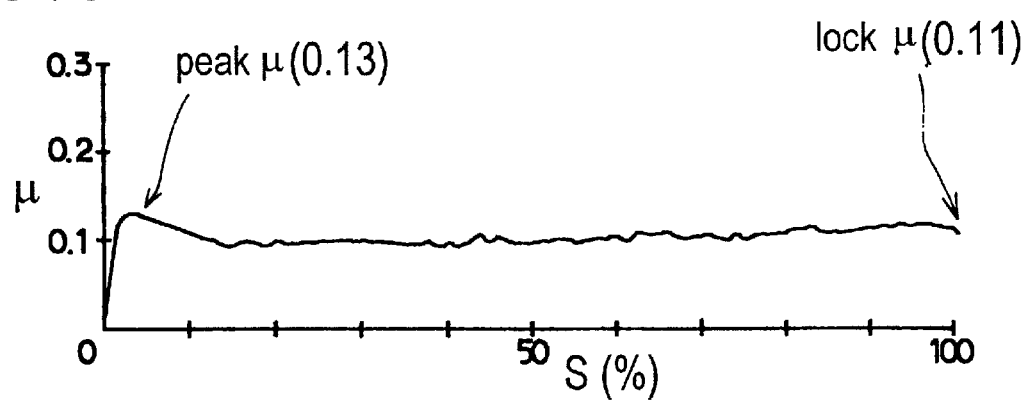
FIG. 3 is the $\mu$-S curve of the tire shown in FIG. 2.

FIG. 3 shows the $\mu$-S curve of the tire shown in FIG. 2, wherein the tread center region Cr was provided with long blocks 2 only, and the shoulder regions were provided with square shoulder blocks 5.

Tread width TW=162 mm
Circumferential length (a) of the long blocks=61.2 mm
Axial length L1 of the long blocks=24.0 mm
Total top surface area S1 of the long blocks=1468.8 sq.mm
Number of the long blocks=28

In this curve, the peak $\mu$ was 0.13, and the lock $\mu$ was 0.11. A tire based on long blocks display a relatively high peak $\mu$, but the lock $\mu$ is low. That is, the critical grip is relatively high, but the drop of grip when exceed the critical grip is large. Thus, the critical controlability is poor.

Figure 4:
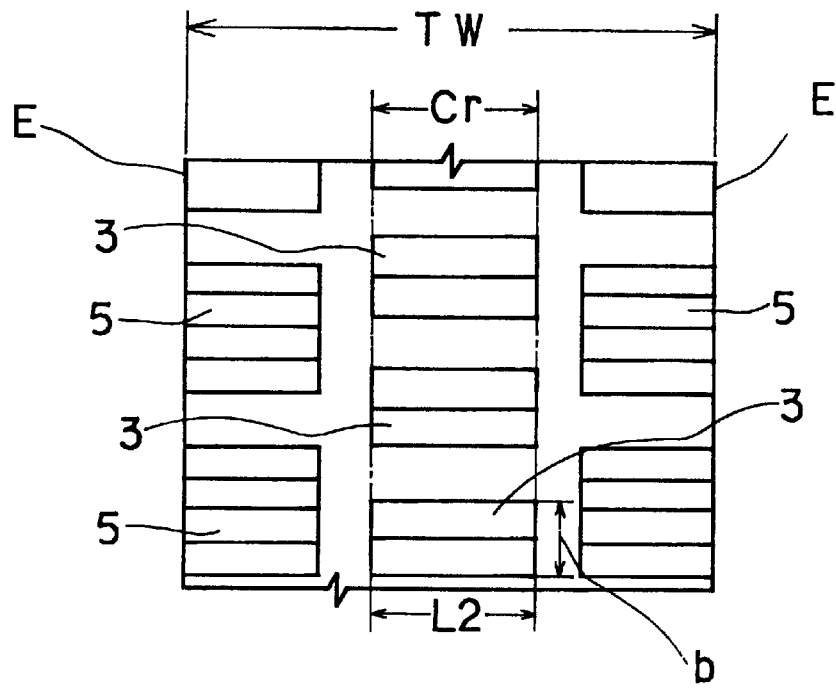
FIG. 4 is a plan view showing the tread portion of another test tire.
Figure 5:
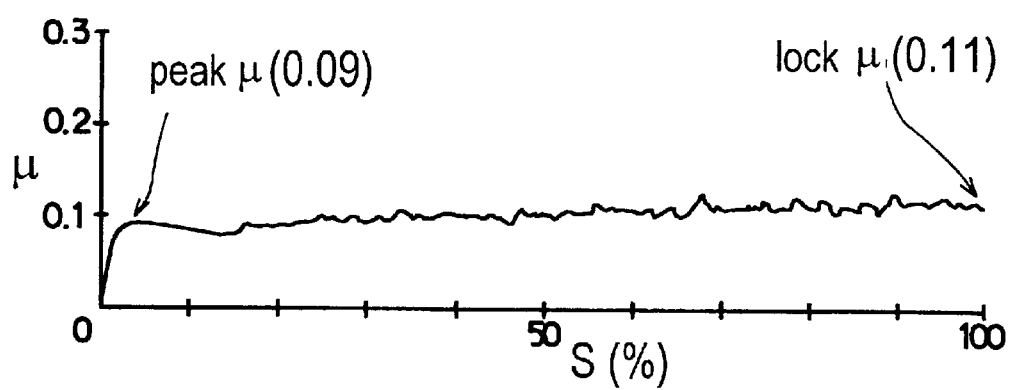
FIG. 5 is the $\mu$-S curve of the tire shown in FIG. 4.

FIG. 5 shows the $\mu$-S curve of the tire shown in FIG. 4, wherein the tread center region Cr was provided with wide blocks 3 only, and the shoulder regions were provided with square shoulder blocks 5.

Tread width TW=162 mm
Circumferential length (b) of the wide blocks=25.6 mm
Axial length L2 of the wide blocks=48.6 mm
Total top surface area S2 of the wide blocks=1244 sq.mm
Number of the wide blocks=56

In this case, the peak $\mu$ was 0.09, and the lock $\mu$ was 0.11. In a tire based on wide blocks, the lock $\mu$ is higher than the peak $\mu$. Thus, it seems to be easy to control the vehicle even if the critical limit is exceeded. In practice however, the control is poor because the critical grip is originally low.

Next, tires provided in the tread center region Cr with alternate long blocks 2 and wide blocks 3 as shown in FIG. 1 were made, changing the sizes. And the $\mu$-S curve was measured. From the test, it was confirmed that it becomes possible to improve both the critical grip and drop of grip by specifically defining the block length ratio Bi (=a/b) of the circumferential length (a) of the long blocks and the circumferential length (b) of the wide blocks.

Figure 6:
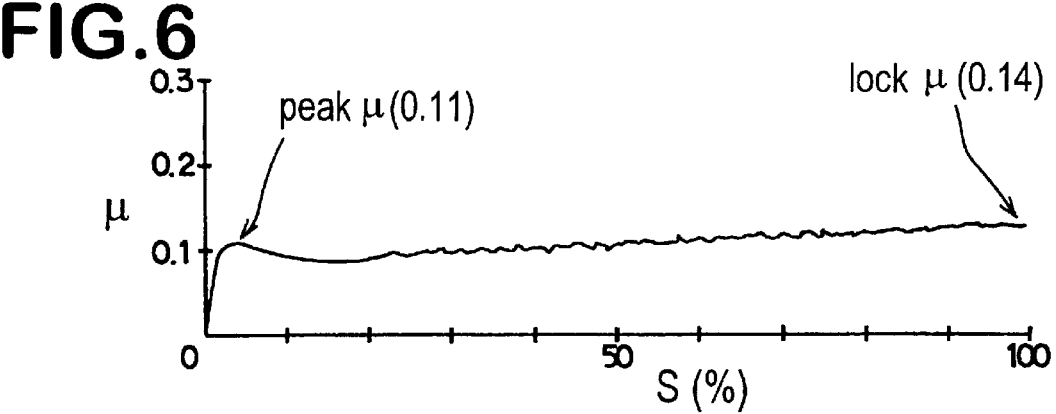
FIGS. 6, 7, 8 and 9 are $\mu$-S curves of tires each having a basic tread pattern.

FIG. 6 shows the $\mu$-S curve of a tire having a tread pattern similar to FIG. 1, but the block length ratio Bi was 0.9.

Tread width TW=162 mm
Circumferential length (a) of the long blocks=24.3 mm
Axial length L1 of the long blocks=24.0 mm
Total top surface area S1 of the long blocks=583.2 sq.mm
Number of the long blocks=28
Circumferential length (b) of the wide blocks=27.0 mm
Axial length L2 of the wide blocks=48.6 mm
Surface area S2 of the wide blocks=1312.2 sq.mm
Number of the wide blocks=28

In this case, the peak $\mu$ was 0.11, and the lock $\mu$ was 0.14. The lock $\mu$ was improved, but the critical grip was not so improved. It is therefore conceivable that the long blocks can not display their full effect to increase the peak $\mu$ when the circumferential length (a) is smaller than the circumferential length (b).

Figure 7:
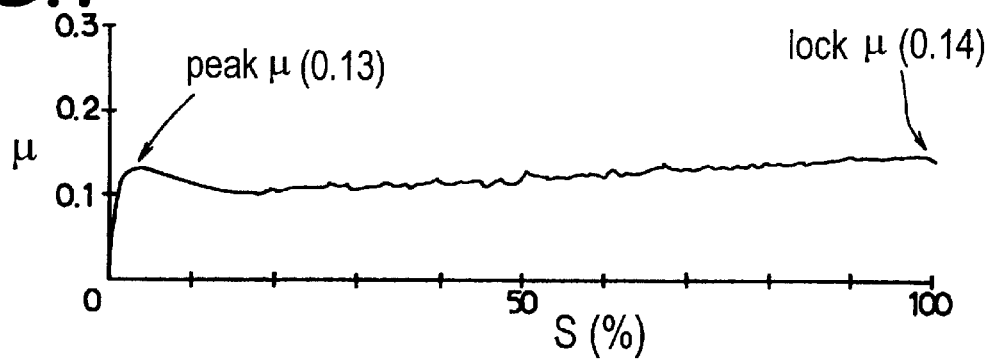

FIG. 7 shows the $\mu$-S curve of a tire having a tread pattern shown in FIG. 1, wherein the block length ratio Bi was 1.1.

Tread width TW=162 mm
Circumferential length (a) of the long blocks=28.0 mm
Axial length L1 of the long blocks=24.0 mm
Total top surface area S1 of the long blocks=672 sq.mm
Number of the long blocks=28
Circumferential length (b) of the wide blocks=23.3 mm
Axial length L2 of the wide blocks=48.6 mm
Surface area S2 of the wide blocks=1132 sq.mm
Number of the wide blocks=28

In this curve, the peak $\mu$ was 0.13, and the lock $\mu$ was 0.14. Both the peak $\mu$ and lock $\mu$ were improved to a high level. Thus, the critical grip is high and the drop of grip is small.

Figure 8:
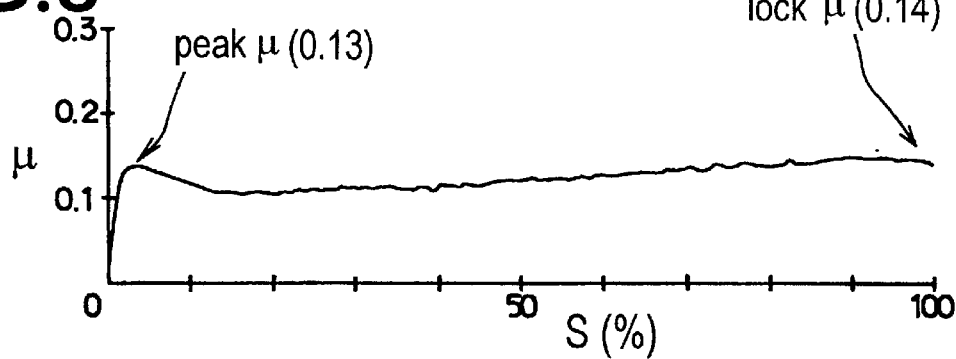

FIG. 8 shows the $\mu$-S curve of a tire having a basic pattern shown in FIG. 1 wherein the block length ratio Bi was 1.5.

Tread width TW=162 mm
Circumferential length (a) of the long blocks=30.7 mm
Axial length L1 of the long blocks=24.0 mm
Total top surface area S1 of the long blocks=737 sq.mm
Number of the long blocks=28
Circumferential length (b) of the wide blocks=20.5 mm
Axial length L2 of the wide blocks=48.6 mm
Surface area S2 of the wide blocks=9 96 sq.mm
Number of the wide blocks=28

In this case, the peak $\mu$ was 0.13, and the lock $\mu$ was 0.14. Both the peak $\mu$ and lock $\mu$ were improved to a high level. Thus, the critical grip is high and the drop of grip is small.

Figure 9:
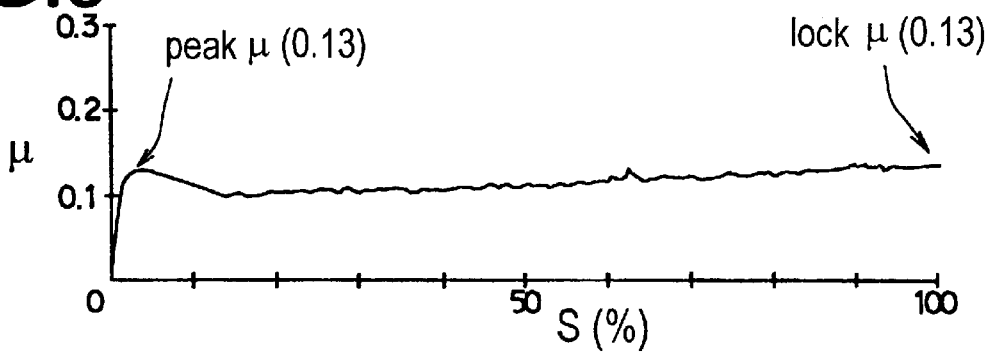

FIG. 9 shows the $\mu$-S curve of a tire having a basic pattern shown in FIG. 1, wherein the block length ratio Bi was 1.8.

Tread width TW=162 mm
Circumferential length (a) of the long blocks=32.9 mm
Axial length L1 of the long blocks=24.0 mm
Total top surface area S1 of the long blocks=790 sq.mm
Number of the long blocks=28
Circumferential length (b) of the wide blocks=18.3 mm
Axial length L2 of the wide blocks=48.6 mm
Surface area S2 of the wide blocks=889 sq.mm
Number of the wide blocks=28

In this curve, the peak $\mu$ was 0.13, and the lock a was 0.13. The lock $\mu$ slightly decreased when compared with the former example. It is conceivable that the wide blocks can not display their full effect to increase the lock $\mu$ when the circumferential length (a) is too large in comparison with the circumferential length (b).

From the many tests carried out by the inventor, it was found that the block length ratio Bi must be in the range of from 1.1 to 1.5 to improve both the peak $\mu$ and lock $\mu$.

During the above-mentioned tests, however, another problem was found. If the rigidity difference between the long blocks 2 and wide blocks 3 is too large, uneven wear is caused.

Therefore, in order to reduce uneven wear, additional tests were carried out, using a tire test drum.

First, test tires were made varying a block surface area ratio Si. The block length ratio Bi was however maintained at a constant value of 1.2. Here, the blocks surface area ratio Si is the ratio (S1/S2) of the surface area S1 of a long block 2 and the surface area S2 of a wide block 3. After running for 4000 km, the blocks in the tread center region Cr were inspected for uneven wear. The test results are shown in the following table 1.

TABLE 1

| Tire No. | 1 | 2 | 3 | 4 | 5 | 6 |
|---|---|---|---|---|---|---|
| Long block | | | | | | |
| a (mm) | 28 | 28 | 28 | 28 | 28 | 28 |
| L1 (mm) | 12.2 | 16.2 | 24.3 | 28.4 | 32.4 | 36.3 |
| S1 (sq. mm) | 342 | 454 | 680 | 795 | 907 | 1016 |
| Wide block | | | | | | |
| b (mm) | 23.3 | 23.3 | 23.3 | 23.3 | 23.3 | 23.3 |
| L2 (mm) | 48.6 | 48.6 | 48.6 | 48.6 | 48.6 | 48.6 |
| S2 (sq. mm) | 1130 | 1130 | 1130 | 1130 | 1130 | 1130 |
| Si = S1/S2 | 0.3 | 0.4 | 0.6 | 0.7 | 0.8 | 0.9 |
| Uneven wear | poor | good | good | good | little good | poor |

From the test, it was confirmed that it is preferable to set the blocks surface area ratio Si in the range of from 0.40 to 0.6 more preferably 0.40 to 0.77. When the blocks surface area ratio Si is less than 0.40, even if the circumferential length is relatively large, the rigidity of the long blocks 2 tends to decrease, and uneven wear of the long blocks 2 is liable to occur. When the blocks surface area ratio Si is more than 0.77, the rigidity of the wide blocks 3 having a shorter circumferential length tends to decrease, and uneven wear is liable to occur in the wide blocks 3.

On the other hand, if the axial length L2 of the wide blocks 3 is too large, the block rigidity difference from the shoulder blocks 5 becomes increased, and uneven wear between the central blocks especially wide blocks 3 and the shoulder blocks 5 is also caused.

Therefore, in order to decrease this type of uneven wear, a similar test was carried out, using a drum. In this test, the axial length L2 of the wide blocks 3 was varied, but the block length ratio Bi was kept at a constant value of 1.2. After running for 4000 km, the uneven wear of the blocks 2 and 3 in the tread center region Cr was compared with that of the shoulder blocks 5. The test results are shown in the following table 2.

TABLE 2

| Tire No. | 7 | 8 | 9 | 10 |
|---|---|---|---|---|
| Long block | | | | |
| a (mm) | 28 | 28 | 28 | 28 |
| L1 (mm) | 10.8 | 16.2 | 21.6 | 27 |
| S1 (sq. mm) | 302 | 454 | 605 | 756 |
| Wide block | | | | |
| b (mm) | 23.3 | 23.3 | 23.3 | 23.3 |
| L2 (mm) | 32.4 | 48.6 | 64.8 | 81 |
| S2 (sq. mm) | 755 | 1130 | 1510 | 1890 |
| L2/TW | 0.2 | 0.3 | 0.4 | 0.5 |
| Uneven wear | good | good | little good | poor |

From the test, it was confirmed that it is preferable that the axial length L2 of the wide blocks 3 is not more than 30% of the tread width TW. When the axial length L2 is less than 18% of the tread width TW, the wide blocks 3 becomes too small. When more than 30%, uneven wear is liable to occur in the shoulder blocks 5.

In the present invention, to derive advantageous effects from the long and wide blocks 2 and 3, that is, an excellent peak $\mu$ of the long blocks and an excellent lock $\mu$ of the wide blocks in a well balanced manner, it is necessary that both the long blocks 2 and wide blocks 3 always appear in the ground contacting patch of the tire during running. Further, it is preferable that the number of the appeared long blocks 2 is substantially the same as that of the wide blocks 3. As a result, on-the-ice running performance can be greatly improved.

Further, it is preferable that the long blocks 2 and wide blocks 3 are provided with axially extending sipes 6 whose width is substantially zero, for example 0.5 to 1 mm and the depth is 40 to 80% of the height of the blocks.

In the above-mentioned examples, the long blocks 2 and wide blocks 3 are a rectangle. It is however possible to use other shapes, for example, polygons, ellipses and the like.

In order to reduce tire noise, when a variable pitching method is employed in determining the circumferential arrangement of the blocks, and, as a result, the circumferential lengths of the long blocks 2 and wide blocks 3 vary along the tire circumferential direction, the mean value is used therefor.

The shoulder regions are preferably provided with blocks rather than ribs or lugs. When blocks are disposed, it is possible to dispose long blocks and wide blocks alternately similar to the tread center region. But it is also possible to dispose one kind of blocks. Further, aside from the above-mentioned rectangles, various shapes may be employed.

Working Examples and Comparison Tests

Passenger car tires of size 195/65R15 having the tread pattern shown in FIG. 10 were made to obtain the $\mu$-S curve. In the test, the tires were mounted on a 6JJx15 standard rim, and the tire pressure was 2.0 kgf/sq.cm, and the vertical tire load was 350 kgf. The test course was mirrorbahn whose temperature was −1.0 to −1.2 deg C at the iced surface, and the braking speed was 30 km/h.

The obtained $\mu$-S curve showed that both the peak $\mu$ and lock $\mu$ could mark an excellent value of 0.15. And it was confirmed by a test driver's feeling that the critical grip is high and the drop of grip force is small even if exceed the critical grip and accordingly controllability is excellent.

In FIG. 10, both the long blocks 2 and wide blocks 3 are generally parallelogram. The block length ratio Bi is 1.19 (average). The blocks surface area ratio Si is 0.65 (average). The axial length L2 is about 28% of the tread width TW. The total number of the alternately arranged long blocks 2 and wide blocks 3 in the central block row 4 is 58. The long blocks 2 and wide blocks 3 are inclined at about 10 degrees with respect to the circumferential direction of the tire. The centers of gravity of the blocks 2 and 3 are set on the tire equator. If attention is given to each wide block 3, the circumferentially adjacent two long blocks 2 are disposed such that the right side edge of the wide block 3 is aligned with the right side edge of one of the two long blocks 2, and the left side edge of the wide block 3 is aligned with the left side edge of the other long block 2. Each wide block 3 is provided on each of the circumferential edges with a narrow slit 3a having a maximum width of about 3 mm. The opposed slits 3a are axially displaced each other with respect to the tire equator. As a result, an excessive increase of the axial rigidity of the wide blocks 3 can be prevented, and thus, a good contact with the iced road can be obtained. Further, all the blocks are provided with axial extending sipes 6 having a groove width of 0.5 mm. The sipes 6 are zigzaged in the middle part of each block, whereby the zigzag parts 6A increase the total length of the sipes to improve the edge effect. The tread portion is further provided on each side of the central block row 4 with a row of axially inner shoulder blocks 5A and a row of axially outer shoulder blocks 5B. Thus, five rows of blocks are formed. The depth of the groove defined between the blocks is 10.3 mm.

What is claimed is:

1. A pneumatic tire comprising a tread portion having a tread width, said tread portion provided with a row of long blocks and wide blocks which are disposed alternately in the circumferential direction of the tire, wherein each block in said row is disposed on a tire equator, each of said long blocks having a surface area S1 and an axial length L1 and a circumferential length (a) larger than the axial length L1, each of said wide blocks having a surface area S2 and a circumferential length (b) and an axial length L2 larger than the circumferential length (b), the ratio (a/b) of the circumferential length (a) and the circumferential length (b) being in the range of from 1.1 to 1.5, and the ratio (S1/S2) of the surface area S1 and the surface area S2 being in the range of from 0.40 to 0.77.

2. The pneumatic tire according to claim 1, wherein the axial length L2 of each of the wide blocks is 18 to 30% of the tread width, and the long blocks and wide blocks are disposed such that at least one of the long blocks and at least one of the wide blocks appear in a ground contacting patch of the tire.

3. The pneumatic tire according to claim 1, wherein each of the long blocks and wide blocks is provided with at least one axially extending sipe.

4. The pneumatic tire according to claim 3, wherein each block has a plurality of sipes.

5. The pneumatic tire according to claim 3 or 4, wherein each sipe is zigzagged in a middle part of each block, and the sipes have a width of about 0.5–1 mm and a depth of about 40–80% of a height of the blocks.

6. The pneumatic tire according to claim 1, 2 or 3, wherein each of the long blocks and the wide blocks is generally parallelogram.

7. The pneumatic tire according to claim 6, wherein the long blocks and the wide blocks are inclined with respect to the circumferential direction of the tire.

8. The pneumatic tire according to claim 6, wherein the long blocks and the wide blocks are inclined at about 10 degrees with respect to the circumferential direction of the tire.

9. The pneumatic tire according to claim 1, 2 or 3, wherein the long blocks and the wide blocks each have a center, and the centers of the blocks are aligned with the tire equator.

10. The pneumatic tire according to claim 1, 2 or 3, wherein the long blocks and the wide blocks each have a center, and the centers of the blocks are displaced in a zigzag manner with the tire equator.

11. The pneumatic tire according to claim 1, wherein the tread portion further comprises, on each side of the row of long blocks and wide blocks, a row of axially inner shoulder blocks and a row of axially outer shoulder blocks, whereby five rows of blocks are formed.

12. The pneumatic tire according to claim 1, wherein the row of long blocks and wide blocks contains about 58 blocks.

13. The pneumatic tire according to claim 1, wherein the axial length L2 is about 28% of the tread width.

* * * * *